United States Patent
Zhang et al.

(10) Patent No.: US 12,423,479 B2
(45) Date of Patent: Sep. 23, 2025

(54) DATA CENTER SECURITY CONTROL MODULE AND CONTROL METHOD THEREOF

(71) Applicant: Shenzhen Fulian Fugui Precision Industry Co., Ltd., Shenzhen (CN)

(72) Inventors: Lin Zhang, Shenzhen (CN); Li-Wen Guo, Shenzhen (CN); Ke-Feng You, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 353 days.

(21) Appl. No.: 17/844,166

(22) Filed: Jun. 20, 2022

(65) Prior Publication Data

US 2023/0334184 A1    Oct. 19, 2023

(30) Foreign Application Priority Data

Apr. 15, 2022 (CN) .......................... 202210399359.5

(51) Int. Cl.
| G06F 1/00 | (2006.01) |
| G06F 21/57 | (2013.01) |
| G06F 21/75 | (2013.01) |
| G06F 21/83 | (2013.01) |

(52) U.S. Cl.
CPC .......... G06F 21/755 (2017.08); G06F 21/572 (2013.01); G06F 21/83 (2013.01)

(58) Field of Classification Search
CPC ....... G06F 21/755; G06F 21/572; G06F 21/83
See application file for complete search history.

(56) References Cited

U.S. PATENT DOCUMENTS

| 10,394,293 B2 | 8/2019 | Das et al. | |
| 2007/0109752 A1* | 5/2007 | Xiao | H05K 7/1411 |
| | | | 361/679.48 |
| 2008/0266996 A1* | 10/2008 | Chen | G11C 5/143 |
| | | | 365/226 |
| 2009/0089571 A1* | 4/2009 | Fu | G06F 9/4405 |
| | | | 713/2 |
| 2012/0110382 A1* | 5/2012 | Tang | G06F 11/263 |
| | | | 714/E11.029 |
| 2013/0110926 A1* | 5/2013 | Yu | H05K 7/20836 |
| | | | 709/204 |

(Continued)

FOREIGN PATENT DOCUMENTS

| TW | I515549 B | 1/2016 |
| TW | 201918880 A | 5/2019 |

*Primary Examiner* — Mohammed H Rehman
(74) *Attorney, Agent, or Firm* — ScienBiziP, P.C.

(57) ABSTRACT

A data center security control module adaptable for installation and use on additional platforms beyond a standard Intel platform includes a baseboard management controller (BMC), a power module, a switch module, and a control module. The power module is configured for supplying power to the BMC. The switch module is electrically connected between the BMC and the power module. The control module obtains information as to a motherboard type of an external motherboard and turns the switch module on or off to make or break a connection between the BMC and the power module depending on the motherboard type. The application also provides a data center security control module control method.

9 Claims, 2 Drawing Sheets

(56) References Cited

U.S. PATENT DOCUMENTS

| | | | | |
|---|---|---|---|---|
| 2013/0311795 A1* | 11/2013 | Cong | ........................ | G06F 1/26 |
| | | | | 713/300 |
| 2013/0318389 A1* | 11/2013 | Cong | .................... | G06F 1/3203 |
| | | | | 713/340 |
| 2016/0335097 A1* | 11/2016 | Yang | ................... | G06F 13/4022 |
| 2018/0275733 A1* | 9/2018 | Hayashi | .................... | H02J 1/10 |
| 2021/0294763 A1* | 9/2021 | Ladkani | ................. | G06F 15/17 |
| 2022/0114056 A1* | 4/2022 | Lee | .................... | G06F 11/1441 |
| 2022/0276876 A1* | 9/2022 | Drury | ..................... | G06F 1/329 |

* cited by examiner

DATA CENTER SECURITY CONTROL MODULE AND CONTROL METHOD THEREOF

TECHNICAL FIELD

The present disclosure relates to the server field, in particular to a data center security control module and a control method thereof.

BACKGROUND

The data center security control module (DC-SCM) is a specification with standardized data center security interface, it integrates the common management, security, and control functions of the server from the typical processor motherboard to a small general module. Firmware information on the typical motherboard is included, providing convenience for developers and users. The data center security control module includes the baseboard management controller (BMC), the BMC is an independent service processor, which is used to manage and monitor various hardware devices in the computer system. The BMC can be used to manage the server, for example, provide fan regulation, voltage detection, temperature detection, system log recording, and other functions needing to be controlled by the BMC. The BMC has a PECI (Platform Environment Control Interface) bus. The BMC can use the PECI bus to monitor the temperature of the central processing unit (CPU) or that of chipset on the external motherboard. When the DC-SCM is independent, it can be used as a component of the motherboard, the DC-SCM can be plugged into different motherboards. However, the motherboards of different platforms (such as Intel platform, AMD platform and Ampere platform) use the PECI bus on the BMC differently.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are some of the embodiments of the present disclosure, not all of them. Based on the embodiments of the present disclosure, all other embodiments obtained by those of ordinary skill in the art without creative work shall fall within the protection scope of the present disclosure.

It should be noted that the terms "first" and "second" are only used for descriptive purposes and cannot be understood as indicating or implying relative importance or implicitly indicating the number of indicated technical features. The features defining "first" and "second" may include one or more of the features, either explicitly or implicitly. For example, the "first electronic component" and the "second electronic component" simply represent two electronic components. In the description of this embodiment, unless otherwise specified, "multiple" means two or more.

In the embodiments of the present disclosure, the words "exemplarily", "for example" or "in some examples" are used as examples, illustrations or explanations. Any embodiment or design described as "exemplary" or "for example" in the embodiments of the present disclosure shall not be interpreted as more preferred or advantageous than other embodiments or design schemes. Specifically, the use of the words "exemplarily", "for example", or "in some examples" is intended to present the relevant concepts in a concrete manner.

Figure 1:
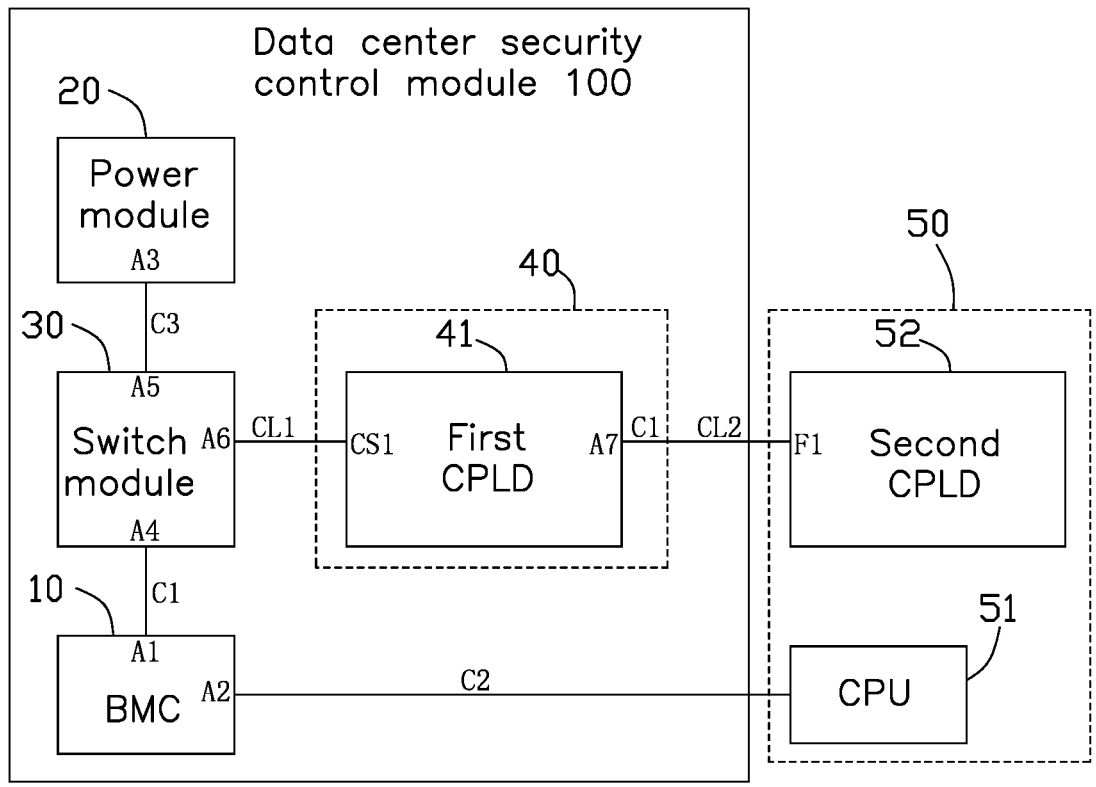
FIG. 1 is a schematic diagram of a data center security control module according to an embodiment of the present disclosure.

FIG. 1 illustrates a data center security control module 100 in accordance with an embodiment of the present disclosure.

The data center security control module 100 includes a baseboard management controller (BMC) 10, a power module 20, a switch module 30, and a control module 40. The data center security control module 100 can be plugged into a computer system (such as a server) that supports DC-SCM. The data center security control module 100 is connected to an external motherboard 50.

In the following, the data center security control module 100 is taken as an example that can be applied to Intel platform, AMD platform, and Ampere platform, and the external motherboard 50 can be the motherboard of the Intel platform, the AMD platform, or the Ampere platform.

The BMC 10 is an independent service processor for managing and monitoring each hardware device in a computer system. For example, the BMC can be used to manage the server, including error query, error warning, error reporting, and isolation of malfunctioning hardware devices.

In the present disclosure, the BMC 10 includes a first port A1, a second port A2, a first power line C1, and a PECI bus C2. The first port A1 of the BMC 10 may be connected to a first end A4 of the switch module 30 through the first power line C1. The second port A2 of the BMC 10 may be connected to a central processing unit (CPU) 51 on the external motherboard 50 through the PECI bus C2.

The Intel platform motherboard will use the PECI bus on the BMC 10, while the AMD platform or the Ampere platform will not use the PECI bus on the BMC 10. Therefore, the PECI bus C2 is used to connect the CPU 51 on the Intel platform motherboard.

The BMC 10 may also include other ports to realize the functions of error query, error warning, error reporting, and error isolation, which are not specifically limited in the embodiments of the present disclosure.

The temperature control mechanism of the CPU 51 is a temperature control mechanism for the self-protection of the CPU 51. When cooling mechanisms are insufficient, the CPU 51 will be powered off, resulting in a sudden power failure of the computer system and data loss. Therefore, the BMC 10 is generally required to read the temperature of the CPU 51. For example, the temperature of the CPU 51 can be read at intervals, and then the fan speed can be adjusted according to the temperature.

The embodiment of the present disclosure can monitor the physical characteristics of the computer system where the BMC 10 is located through the BMC 10, such as the temperature, voltage, fan working state, power supply, and other information of each component. The BMC 10 can also provide the remote management platform with virtual keyboard, interface, mouse, power supply, and other functions to realize the remote management of the computer system where the BMC 10 is located elsewhere.

The power module 20 is used to supply power to the BMC 10. When the BMC 10 uses the PECI bus C2 to monitor the temperature of the CPU 51 on the Intel platform motherboard, the power module 20 provides power for the BMC 10.

The power module 20 includes an output end A3 and a second power line C3. The output end A3 of the power module 20 can be connected to the second end A5 of the switch module 30 through the second power line C3.

The power module 20 is independent of the power supply of the computer system. When the host of the computer system is powered off, the power module 20 can continue to supply power to the BMC 10.

The switch module 30 includes a first end A4, a second end A5, and a third end A6. The third end A6 is used to receive the control signal output by the control module 40, and then turn on or off the connection between the BMC 10 and the power module 20 according to the control signal.

In one embodiment, the switch module 30 may be an electronic switch or a switch chip, and the embodiment of the present disclosure does not specifically limit the specific implementation of the switch module 30.

The control module 40 is used to obtain the motherboard type of the computer system into which the current data center security control module 100 is plugged. The control module 40 can actively request the motherboard type of the platform which carries it and can also receive the motherboard type sent by the platform. For example, when the user inserts the data center security control module 100 provided in the present disclosure into the Intel platform, the user can request to know the motherboard type from the Intel platform, or the Intel platform can actively send its motherboard type information to the control module 40 of the data center security control module 100.

The control module 40 may include a first complex programming logic device (CPLD) 41. The first CPLD 41 is used for logic control and information interaction with the motherboard. The first CPLD 41 includes a first control end CS1 and an input end A7. The control module 40 also includes a first control line CL1 and an input line CL2. The first control end CS1 of the control module 40 can be connected to the third end A6 of the switch module 30 through the first control line CL1. The first control line CL1 is used for transmitting the first control signal and the second control signal. When the switch module 30 receives the first control signal, the switch module 30 turns on the connection between the BMC 10 and the power module 20, and the power module 20 supplies power to the BMC 10. When the switch module 30 receives the second control signal, the connection between the BMC 10 and the power module 20 is disconnected, and the power module 20 stops supplying power to the BMC 10. The input end A7 of the control module 40 can be connected to the output end F1 of the second CPLD 52 on the external motherboard 50 through the input line CL2.

If the data center security control module 100 is inserted into the Intel platform, and the data center security control module 100 is connected to the Intel platform motherboard, the second CPLD 52 in FIG. 1 represents the complex programming logic device of the Intel platform.

The input end A7 of the control module 40 can be connected to the output end F1 of the second CPLD 52 on the Intel platform through the input line CL2. The first CPLD 41 acquires information as to the motherboard type transmitted by the second CPLD 52 of the Intel platform.

If the data center security control module 100 is inserted into the AMD platform or the Ampere platform, and the data center security control module 100 is connected to the AMD platform or the Ampere platform motherboard, the second CPLD 52 in FIG. 1 represents the complex programming logic device of the AMD platform or the Ampere platform. The input end A7 of the control module 40 can be connected to the output end F1 of the second CPLD 52 on the AMD platform or the Ampere platform through the input line CL2. The first CPLD 41 acquires information as to the motherboard type transmitted by the second CPLD 52 of the AMD platform or the Ampere platform.

The first CPLD 41 can actively request information as to the motherboard type of its corresponding platform from the second CPLD 52, and the first CPLD 41 can also receive such information sent by the second CPLD 52.

The PLANTE_TYPE0/1 signal is transmitted between the first CPLD 41 and the second CPLD 52 through the input line CL2. When the PLANTE_TYPE0/1 signal is 00, the first CPLD 41 obtains information that the motherboard type of the motherboard currently connected is the Intel platform motherboard. When the PLANTE_TYPE0/1 signal is not 00, the first CPLD 41 obtains information that the motherboard type of the currently connected motherboard is a non-Intel platform motherboard.

It can be understood that the above data center security control module 100 can also include BMC flash, basic input/output system (BIOS) flash and trusted platform module (TPM). The BMC flash is used to store firmware of the BMC. The BIOS flash is used to store BIOS firmware. The TPM can be used for server security.

The functional modules illustrated in the embodiments of the present disclosure do not constitute specific limitations on the data center security control module 100. In other embodiments of the present disclosure, the data center security control module 100 may include more or fewer components than shown in the figures, or can combine some components, or split some components, or have different component arrangements. The illustrated components may be implemented in hardware, software, or a combination of software and hardware.

The operating principle of the data center security control module 100 is described in detail below.

Figure 2:
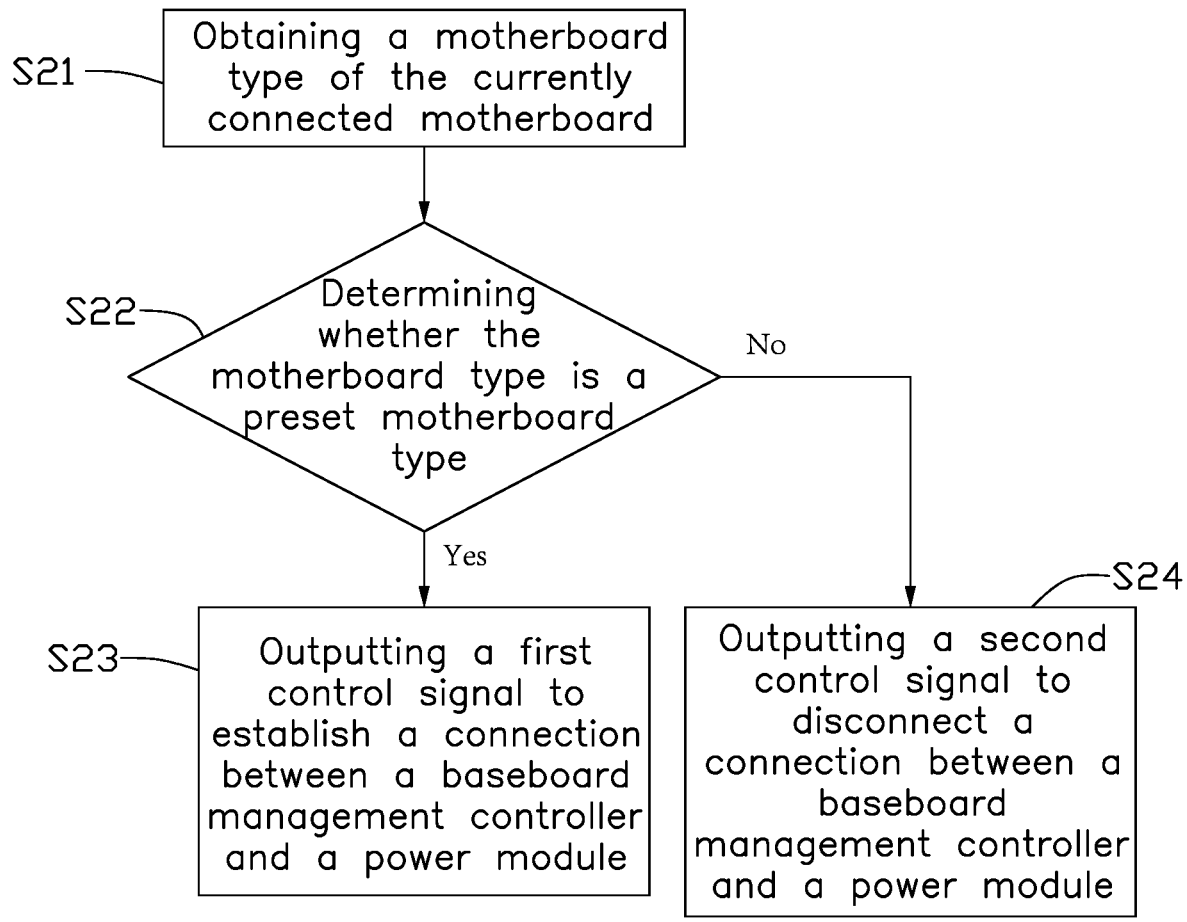
FIG. 2 is a flowchart of a data center security control module control method according to an embodiment of the present disclosure.

FIG. 2 is a flowchart depicting an embodiment of a data center security control module control method. The data center security control module control method can be applied to the data center security control module 100 in FIG. 1 above, and the data center security control module control method can be executed by the control module 40.

Each block shown in FIG. 2 represents one or more processes, methods, or subroutines carried out in the example method. Furthermore, the illustrated order of blocks is illustrative only and the order of the blocks can change. Additional blocks can be added or fewer blocks may be utilized, without departing from the present disclosure. The example method can begin at block 21.

At block 21, obtaining information as to a motherboard type of the currently connected motherboard.

At block 22, determining whether the motherboard type is a preset motherboard type. If the motherboard type is a preset motherboard type, block 23 is implemented, otherwise block 24 is implemented.

When the preset motherboard type is Intel platform motherboard:

At block 23, outputting a first control signal to establish a connection between a baseboard management controller and a power module.

At block 24, outputting a second control signal to disconnect a connection between a baseboard management controller and a power module.

As shown in FIG. 1, suppose the user inserts the data center security control module 100 into the Intel platform. The data center security control module 100 establishes connection with Intel platform motherboard. The first CPLD 41 obtains the motherboard type information (a PLANTE_TYPE0/1 signal) transmitted by the second CPLD 52 on the Intel platform.

The first CPLD 41 detects the PLANTE_TYPE0/1 signal as being 00, and it is determined that the motherboard type is the preset motherboard type Intel platform motherboard. The control module 40 outputs a first control signal to the switch module 30. After receiving the first control signal, the switch module 30 turns on the connection between the power module 20 and the BMC 10, and the power module 20 can supply power to the BMC 10.

Suppose the user inserts the data center security control module 100 into the AMD platform or the Ampere platform. The data center security control module 100 establishes a connection with the AMD platform or the Ampere platform motherboard, and the first CPLD 41 obtains information as to the motherboard type (a PLANTE_TYPE0/1 signal) transmitted by the second CPLD 52 on the AMD platform or the Ampere platform.

The first CPLD 41 detects that the PLANTE_TYPE0/1 signal is not 00, thus it is determined that the motherboard type is not the preset motherboard type Intel platform motherboard. The control module 40 outputs a second control signal to the switch module 30. After receiving the second control signal, the switch module 30 disconnects the power module 20 from the BMC 10, and the power module 20 does not supply power to the BMC 10.

The data center security control module 100 determines the motherboard type of the currently connected platform through the first CPLD, and then turns on or off the connection between the power module 20 and the BMC 10 according to the type of motherboard of the connected platform. The use of PECI bus on the DC-SCM can be adapted to different mainboards, and precise control of the power module 20 can be affected.

The present disclosure also provides a storage medium. The storage medium is a computer readable storage medium. The computer-readable storage medium stores computer instructions for executing the data center security control method.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A data center security control module comprising:
a baseboard management controller (BMC); and
a power module configured for supplying power to the BMC;
a switch module electrically connected between the BMC and the power module; and
a control module configured for obtaining a motherboard type of an external motherboard and controlling the switch module to turn on or off a connection between the BMC and the power module according to the motherboard type;
wherein when the motherboard type is a preset motherboard type, the control module controls the switch module to conduct the connection between the BMC and the power module, and
wherein the control module is further configured to receive a type signal from the external motherboard, and determine the motherboard type of the external motherboard according to the type signal.

2. The data center security control module of claim 1, wherein the preset motherboard type is Intel platform motherboard.

3. The data center security control module of claim 2, wherein the BMC comprises a PECI bus, the BMC calls the PECI bus to monitor a temperature of the external motherboard.

4. A data center security control module comprising:
a baseboard management controller (BMC); and
a power module configured for supplying power to the BMC;
a switch module electrically connected between the BMC and the power module; and
a control module configured for obtaining a motherboard type of an external motherboard and controlling the switch module to turn on or off a connection between the BMC and the power module according to the motherboard type;
wherein when the motherboard type is a preset motherboard type, the control module controls the switch module to conduct the connection between the BMC and the power module;
wherein when the motherboard type is not the preset motherboard type, the control module controls the switch module to disconnect the connection between the BMC and the power module, and
wherein the control module is further configured to receive a type signal from the external motherboard, and determine the motherboard type of the external motherboard according to the type signal.

5. The data center security control module of claim 4, wherein the control module comprises a complex programmable logic device (CPLD), the CPLD requests the motherboard type from the external motherboard or receives the motherboard type sent by the external motherboard.

6. The data center security control module of claim 5, (wherein the preset motherboard type is Intel platform motherboard.

7. The data center security control module of claim 6, wherein the BMC comprises a PECI bus, the BMC calls the PECI bus to monitor a temperature of the external motherboard.

8. A data center security control module control method applied to a data center security control module, the data center security control module comprising a baseboard management controller (BMC), a power module, a switch module and a control module; the switch module electrically connected between the BMC and the power module, and the control module electrically connected to the switch module, and the data center security control module control method comprising:
obtaining a motherboard type of an external motherboard; and
controlling the switch module to turn on or off a connection between the BMC and the power module according to the motherboard type of the external motherboard;
wherein when the motherboard type is a preset motherboard type, the control module controls the switch module to conduct the connection between the BMC and the power module, and receiving a type signal from the external motherboard, and determining the motherboard type of the external motherboard according to the type signal.

9. The data center security control module control method of claim 8, wherein the preset motherboard type is Intel platform motherboard.

\* \* \* \* \*